United States Patent
Kuzma et al.

(10) Patent No.: US 12,109,923 B2
(45) Date of Patent: Oct. 8, 2024

(54) LONGITUDINAL ADJUSTER AND VEHICLE SEAT

(71) Applicant: ADIENT US LLC, Plymouth, MI (US)

(72) Inventors: Martin Kuzma, Trencianska Turna (SK); Andrej Sulak, Podluzany (SK)

(*) Notice: Subject to any disclaimer, the term of this patent is extended or adjusted under 35 U.S.C. 154(b) by 126 days.

(21) Appl. No.: 17/796,718

(22) PCT Filed: Feb. 1, 2021

(86) PCT No.: PCT/EP2021/052294
§ 371 (c)(1),
(2) Date: Aug. 1, 2022

(87) PCT Pub. No.: WO2021/156199
PCT Pub. Date: Aug. 12, 2021

(65) Prior Publication Data
US 2023/0062040 A1    Mar. 2, 2023

(30) Foreign Application Priority Data

Feb. 4, 2020  (DE) ............ 10 2020 102 804.0
Apr. 16, 2020 (DE) ............ 10 2020 110 442.1

(51) Int. Cl.
*B60N 2/00*  (2006.01)
*B60N 2/02*  (2006.01)
(Continued)

(52) U.S. Cl.
CPC ....... *B60N 2/4214* (2013.01); *B60N 2/02246* (2023.08); *B60N 2/067* (2013.01); *B60N 2/02258* (2023.08)

(58) Field of Classification Search
CPC ............... B60N 2/02246; B60N 2/067; B60N 2/02258; B60N 2/4249
See application file for complete search history.

(56) References Cited

U.S. PATENT DOCUMENTS 8,061,756 B2   11/2011  Kimata
8,826,756 B2 *  9/2014  Hoffmann ............ B29C 66/344
                                               74/89.34
(Continued)

FOREIGN PATENT DOCUMENTS

DE    102005023095 A1    12/2005
DE    102005001333 A1     7/2006
(Continued)

OTHER PUBLICATIONS

PCT International Search Report and Written Opinion (PCT/EP2021/052294).

*Primary Examiner* — Amy J. Sterling
(74) *Attorney, Agent, or Firm* — Marshall & Melhorn, LLC

(57) ABSTRACT

A longitudinal adjuster for a vehicle seat may have a first rail and a second rail. The rails may mutually engage around each other to form an inner channel. A spindle nut may be supported by the second rail and a spindle, operationally connected to the spindle nut, may be arranged in the inner channel. In one end region of the first rail, a screw drive driven by a motor and interacting with the spindle may be arranged. The screw drive may be enclosed by a housing. The housing may have at least one cylindrical bearing portion for bearing a worm wheel connected to the spindle. The housing may also at least one step adjoining the cylindrical bearing portion. The step may be designed to support the worm wheel in the event of a crash. A vehicle seat having the longitudinal adjuster is also provided.

13 Claims, 5 Drawing Sheets

(51) Int. Cl.
*B60N 2/06* (2006.01)
*B60N 2/42* (2006.01)

(56) References Cited

U.S. PATENT DOCUMENTS

| | | | |
|---|---|---|---|
| 11,878,607 B2 * | 1/2024 | Gregor | B60N 2/067 |
| 2023/0026058 A1 * | 1/2023 | Becker | B60N 2/067 |

FOREIGN PATENT DOCUMENTS

| | | |
|---|---|---|
| DE | 102006000195 A1 | 10/2006 |
| DE | 102006011718 A1 | 10/2006 |
| DE | 102012106196 B3 | 5/2014 |
| DE | 102013207665 A1 | 7/2014 |
| DE | 112019000026 T5 | 12/2019 |

* cited by examiner

LONGITUDINAL ADJUSTER AND VEHICLE SEAT

The invention relates to a longitudinal adjuster, in particular for a vehicle seat, the longitudinal adjuster having at least one rail pair which is formed by a first rail and a second rail which can be displaced relative to the first rail in the longitudinal direction, wherein the rails mutually engage around each other with an inner channel being formed, wherein a spindle nut which is supported with the second rail and a spindle which is operationally connected to the spindle nut are arranged in the inner channel, wherein a spindle gear which can be driven by a motor and which cooperates with the spindle is arranged in an end region of the first rail, wherein the spindle gear is surrounded by a gear mechanism housing, wherein the gear mechanism housing has at least one cylindrical bearing portion for supporting a worm gear which is connected to the spindle. The invention further relates to a vehicle seat.

PRIOR ART

DE 10 2005 023 095 A1 discloses a generic drive apparatus for a motor vehicle seat in a sliding apparatus. The drive apparatus for use with a motor vehicle seat sliding apparatus comprises matching fixed and movable rail portions which can be moved between a front position and a rear position. The drive apparatus comprises a spindle, a spindle nut, a gear mechanism and an installation apparatus. The spindle defines a spindle axis and has a spindle thread which extends in a longitudinal direction. The spindle nut can be securely fixed to a first rail portion and has an inner thread, which can engage in the spindle thread. The gear mechanism can be mounted on another respective rail portion and selectively rotates the spindle about the spindle axis. The spindle of the drive apparatus is provided with a spindle wheel which in the mounted state of the drive apparatus extends outward through spindle wheel openings of the movable rail portion. An alternative embodiment of such a drive apparatus is known from DE 10 2013 207 665 A1.

U.S. Pat. No. 8,061,756 B2 discloses an electrically operated seat sliding apparatus which has a lower rail which is secured to a floor of a vehicle body and an upper rail which is displaceably arranged on the lower rail. A seat is connected to the upper rail. A screw shaft is arranged inside the upper rail. A nut is screwed to the screw shaft and connected to the lower rail. A motor is arranged at the side of the upper rail. A gear mechanism is secured to the upper rail in order to transmit a rotation of the motor to the screw shaft.

DE 10 2006 000 195 A1 discloses a motor-operated adjustment mechanism for a vehicle seat which has a first rail for securing to a vehicle floor and a second rail for securing to the vehicle seat. The second rail is supported in a sliding manner relative to the first rail. The adjustment mechanism further has a thread shaft which is screwed to a nut element, wherein the nut element is provided on the first rail. The thread shaft has a stepped portion and a portion having a smaller diameter. The adjustment mechanism additionally has a disk which is in engagement with the stepped portion of the thread shaft, a securing element which is provided on the portion with the smaller diameter and a gear mechanism which is provided on the second rail.

DE 10 2005 001 333 A1 discloses a gear mechanism for an adjustment device for a vehicle seat. Within a gear mechanism housing a spindle nut which is positioned on a spindle is arranged between two bearing bushes. In order to reduce noise, these bearing bushes have a guiding portion for guiding the spindle nut and a guiding portion for guiding the thread spindle. To this end, for example, a cylindrical bearing portion of the bearing bushes is provided with a changing inner diameter.

DE 10 2006 011 718 A1 discloses an adjustment apparatus which has a gear mechanism which is secured by a mounting bracket on a first guide rail, wherein the gear mechanism extends with a journal-like protuberance through an opening in the first guide rail and the mounting bracket is crimped on the first guide rail.

DE 11 2019 000 026 T5 discloses an adjustment apparatus for a vehicle seat which comprises a housing, an endless screw, a worm gear and a spindle. The endless screw is arranged for rotation about a first axis within the housing and comprises a helical thread. The worm gear is arranged for rotation about a second axis within the housing and engages with the endless screw in each other. The spindle extends for rotation about the second axis through the housing and the worm gear. The spindle engages with the worm gear in each other.

BACKGROUND

An object of the invention is to improve a longitudinal adjuster of the type mentioned in the introduction, in particular a longitudinal adjuster having a spindle gear which enables increased rigidity and load-bearing capacity, and a corresponding vehicle seat.

SUMMARY

This object is achieved according to the invention with a longitudinal adjuster, in particular for a vehicle seat, the longitudinal adjuster having at least one rail pair which is formed by a first rail and a second rail which can be displaced relative to the first rail in the longitudinal direction, wherein the rails mutually engage around each other with an inner channel being formed, wherein a spindle nut which is supported with the second rail and a spindle which is operationally connected to the spindle nut are arranged in the inner channel, wherein a spindle gear which can be driven by a motor and which cooperates with the spindle is arranged in an end region of the first rail, wherein the spindle gear is surrounded by a gear mechanism housing, wherein the gear mechanism housing has at least one cylindrical bearing portion for supporting a worm gear which is connected to the spindle, wherein the gear mechanism housing has a step which adjoins the cylindrical bearing portion, wherein the step is configured to support the worm gear in the event of a crash.

As a result of the fact that the gear mechanism housing has a step which adjoins the cylindrical bearing portion, the gear mechanism housing is reinforced and can absorb an increased load in the axial direction of the spindle and direct it away via the spindle retention member. Furthermore, as a result of the fact that the step is configured to support the worm gear in the event of a crash, there is provided inside the gear mechanism housing an additional axial abutment face or support face on which in the event of a crash the worm gear which is supported in the gear mechanism housing can be supported.

Advantageous embodiments which can be used individually or in combination with each other are set out in the dependent claims.

The first rail is preferably a seat rail which can be connected to a vehicle seat. The second rail is preferably a floor rail which can be connected to a vehicle structure. A possible inner construction and the operating method and function of the spindle gear is known, for example, from DE 10 2013 207 665 A1 whose content in this regard is explicitly incorporated herein by reference.

The gear mechanism housing may be formed by a plurality of housing portions. The gear mechanism housing may be formed from precisely two housing portions. Furthermore, there may be provided a gear mechanism retention member which surrounds the gear mechanism housing and by which the spindle gear is connected to the first rail. The spindle can be inserted through two mutually parallel members of a substantially U-shaped gear mechanism retention member. The two opposing members are preferably connected to each other in a manner known per se by a web. The two members may alternatively not have any web, that is to say, not have any connection to each other.

Each of the members may be adjoined by a securing member by which the gear mechanism retention member is fitted to the upper rail. The securing members are preferably in each case bent or angled with respect to their adjacent member through approximately 90°. In the mounted state of the substantially U-shaped gear mechanism retention member, the gear mechanism housing is preferably received in the longitudinal direction x between the members. The securing members may have threaded holes by which in cooperation with corresponding screws and/or threaded bolts a connection to the first rail can be produced.

The worm gear may in a normal state of use have a spacing with respect to the step. In a normal state of use, a gap may be provided between the worm gear and the step. In the event of a crash, the worm gear can be supported directly on the step.

In the event of a crash, the worm gear may be able to be supported coaxially with respect to a spindle axis of the spindle by the step. The gear mechanism housing may have two steps. The spindle nut is preferably arranged axially with respect to a spindle axis between the two steps. The gear mechanism housing may in each case have a cylindrical bearing portion which adjoins a step in each case. The at least one step may protrude radially inward relative to the cylindrical bearing portion. The at least one radially inwardly protruding step of the gear mechanism housing can act as an additional support face for the worm gear in an axial direction. An inner diameter of the at least one step may be smaller than an inner diameter of the cylindrical bearing portion.

The gear mechanism housing may, preferably in an upper portion of the cylindrical bearing portion, have a recess. A worm gear which is screwed to the spindle can be supported by two bearing sleeves in the gear mechanism housing. The bearing sleeves may each have a collar. Each bearing sleeve may have a projection which cooperates with the recess of the gear mechanism housing. Using the projection of the bearing sleeve together with the recess of the gear mechanism housing, a rotation prevention member can be provided for the bearing sleeve. The bearing sleeves can be supported in the gear mechanism housing in a manner preventing rotation.

The object is further achieved according to the invention by a vehicle seat having a longitudinal adjuster described above.

BRIEF DESCRIPTION OF THE FIGURES

The invention is explained in greater detail below with reference to an advantageous embodiment which is illustrated in the Figures. However, the invention is not limited to this embodiment. In the drawings.

DETAILED DESCRIPTION

Figure 1:
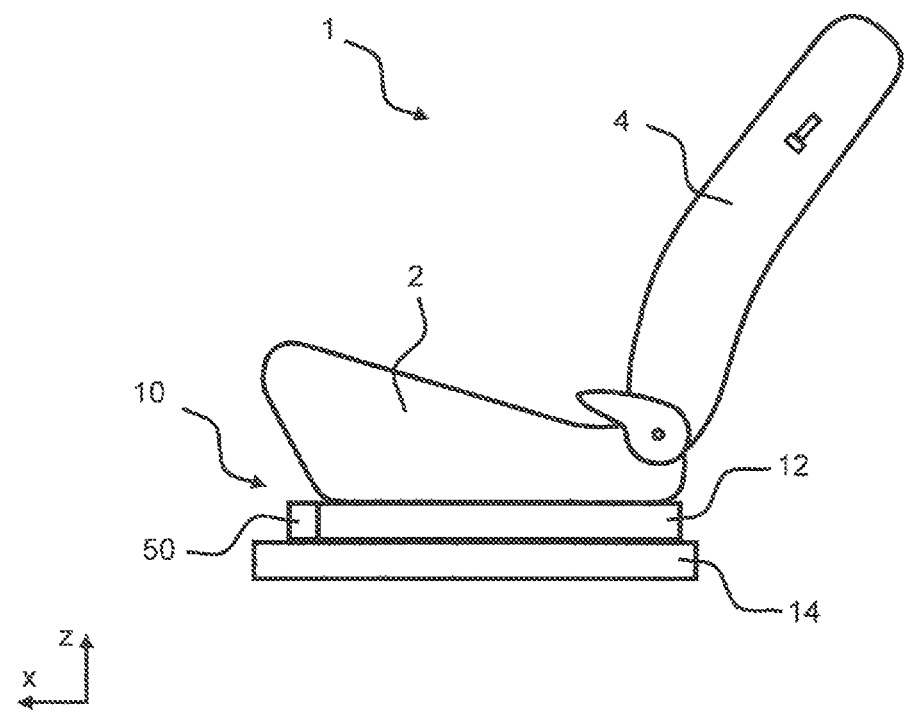
FIG. 1: shows a vehicle seat according to the invention.

A vehicle seat 1 schematically illustrated in FIG. 1 is described below using three spatial directions which extend perpendicularly to each other. A longitudinal direction x extends in a vehicle seat 1 which is installed in a vehicle substantially horizontally and preferably parallel with a longitudinal vehicle direction which corresponds to the usual travel direction of the vehicle. A transverse direction y which extends perpendicularly to the longitudinal direction x is also orientated horizontally in the vehicle and extends parallel with a transverse vehicle direction. A vertical direction z extends perpendicularly to the longitudinal direction x and perpendicularly to the transverse direction y. In a vehicle seat 1 which is installed in the vehicle, the vertical direction z extends parallel with the vertical vehicle axis.

The position indications and direction indications used, such as, for example, front, rear, top and bottom refer to a viewing direction of a passenger sitting in the vehicle seat 1 in a normal seating position, wherein the vehicle seat 1 is installed in the vehicle, is in a suitable position for use for conveying people with an upright backrest 4 and is orientated in the usual manner in the travel direction. The vehicle seat 1 may, however, also be installed in a different orientation, for example, transversely relative to the travel direction.

The vehicle seat 1 shown in FIG. 1 for a motor vehicle has a seat portion 2 and a backrest 4 which can be adjusted in terms of its inclination relative to the seat portion 2. An inclination of the backrest 4 may, for example, be adjustable by a locking fitting or a gear mechanism fitting. The vehicle seat 1 is mounted to adjust a longitudinal seat position on a longitudinal adjuster 10.

Figure 2:
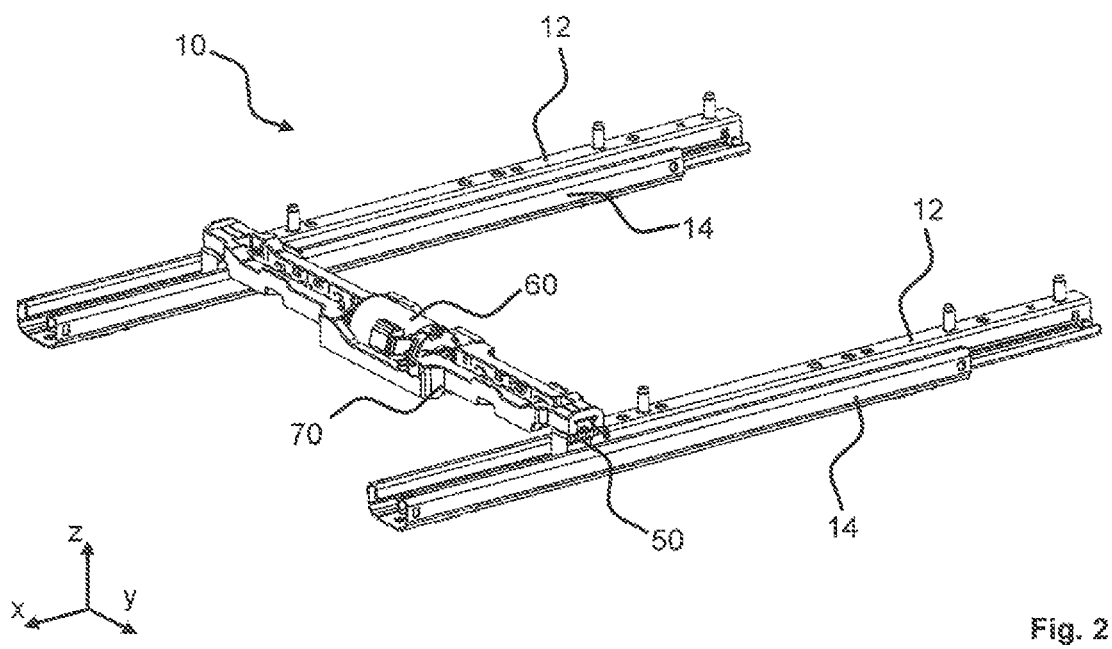
FIG. 2: shows a longitudinal adjuster according to the invention.

FIG. 2 shows by way of example a longitudinal adjuster 10 according to the invention for a vehicle seat 1. The longitudinal adjuster 10 has at least one rail pair, in this instance two rail pairs. The rail pairs are in each case formed from a first rail 12, in particular for connection to a seat structure of the vehicle seat 1, and a second rail 14, in particular for connection to a vehicle structure. The rails 12, 14 of the rail pair can be displaced in the longitudinal direction x relative to each other and mutually engage around each other with an inner channel 16 being formed.

A spindle nut 30 which is securely connected to the second rail 14 and a spindle 20 which is operationally connected to the spindle nut 30 is arranged in the inner channel 16. The spindle 20 extends along a spindle axis parallel with the longitudinal direction x. A spindle gear 50 which can be driven by a motor 60 is arranged at a front end of the first rail 12. The spindle 20 can be driven by the spindle gear 50. The motor 60 is retained on a motor carrier 70 which is mounted between the two spindle gears 50 of the respective rail pairs and drives the two spindle gears 50 using a shaft which is not illustrated in FIG. 2.

Figure 3:
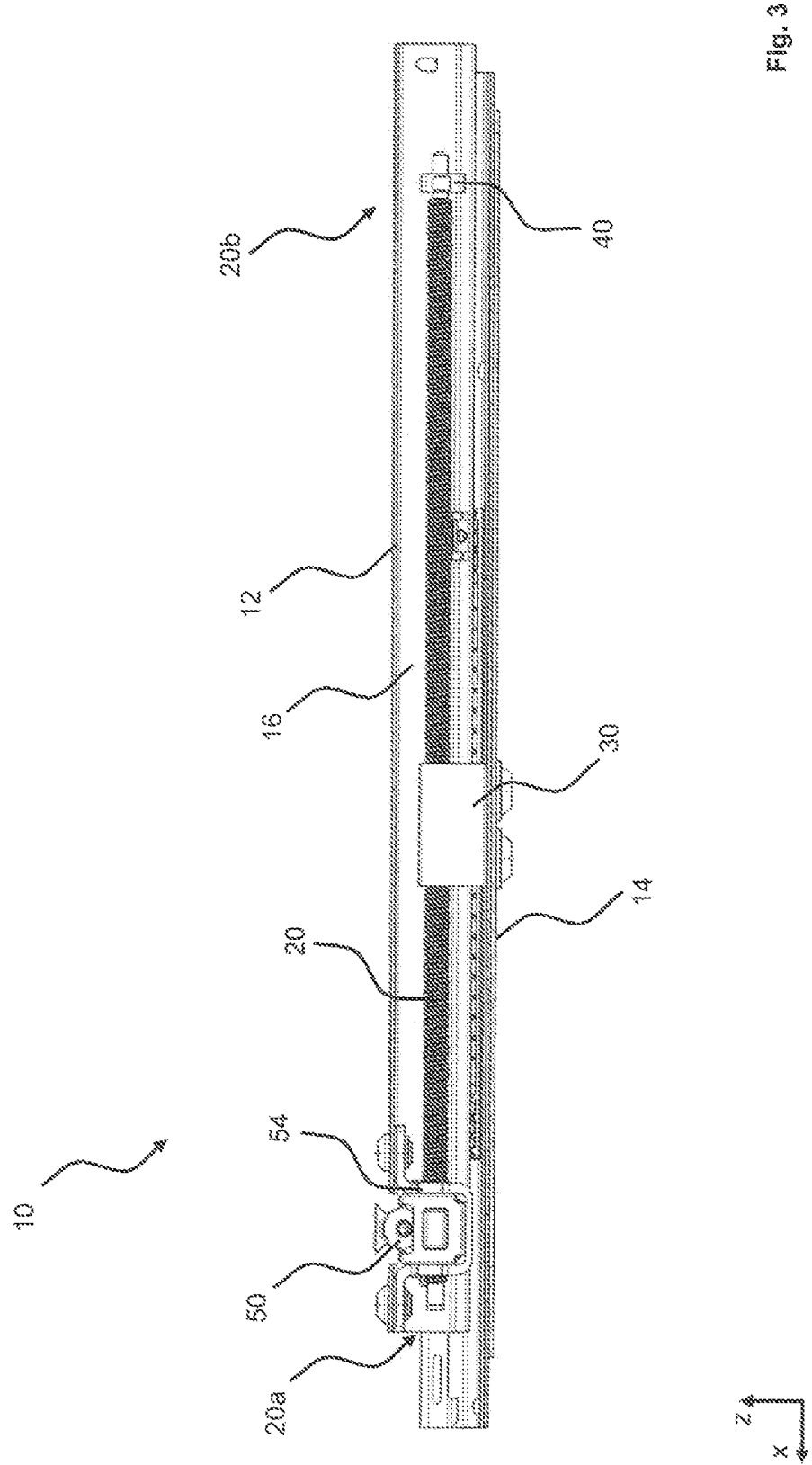
FIG. 3: shows a side view of a rail pair of the longitudinal adjuster of FIG. 2, having a first rail which is sectioned in a plane.

FIG. 3 shows a side view of a rail pair of the longitudinal adjuster 10 with a first rail 12 which is sectioned in a plane. The spindle 20 is rotatably supported in the region of a rear end portion 20b of the spindle 20 by a spindle retention member. The spindle retention member is in this instance configured as a rotary bearing 40 and is retained on the first rail 12. In a region of a front end portion 20a of the spindle 20, for rotatably driving the spindle 20 there is arranged a spindle gear 50 which is retained in a gear mechanism retention member 54 which is securely connected to the first rail 12.

Figure 4:
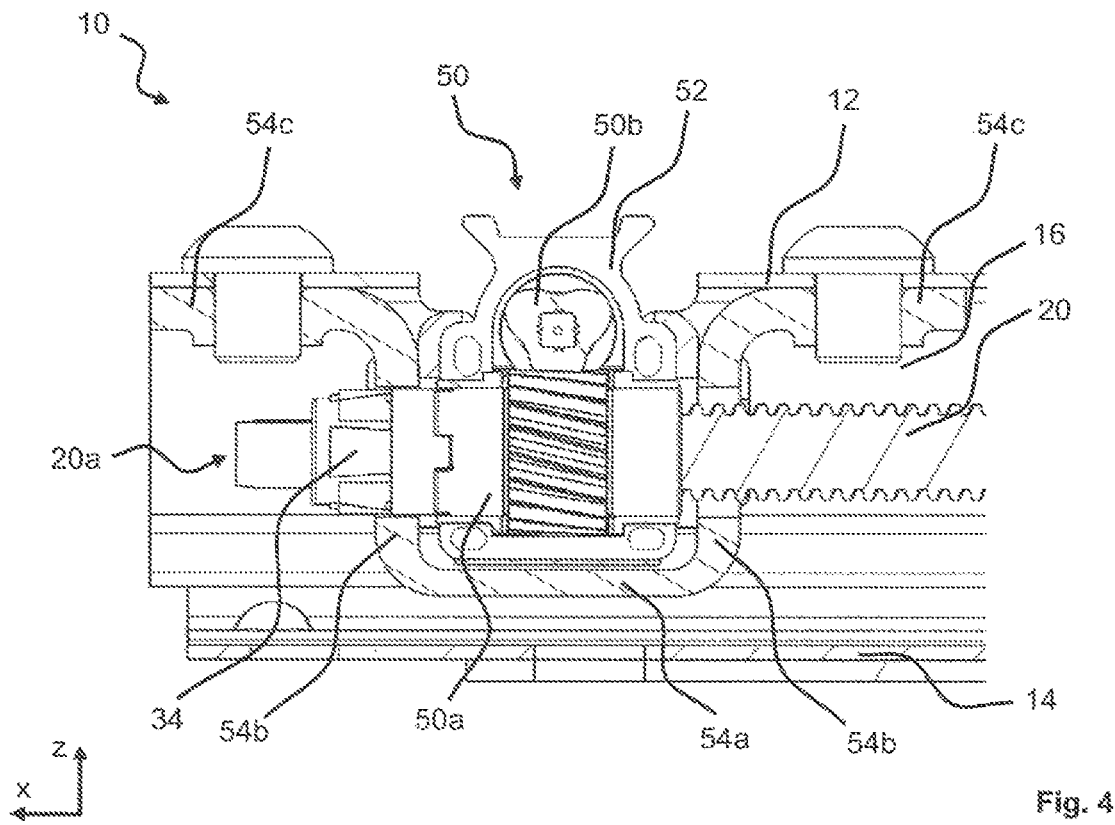
FIG. 4: shows a cut-out of a longitudinal section through the rail pair of FIG. 3, in the region of a gear mechanism retention member.
Figure 5:
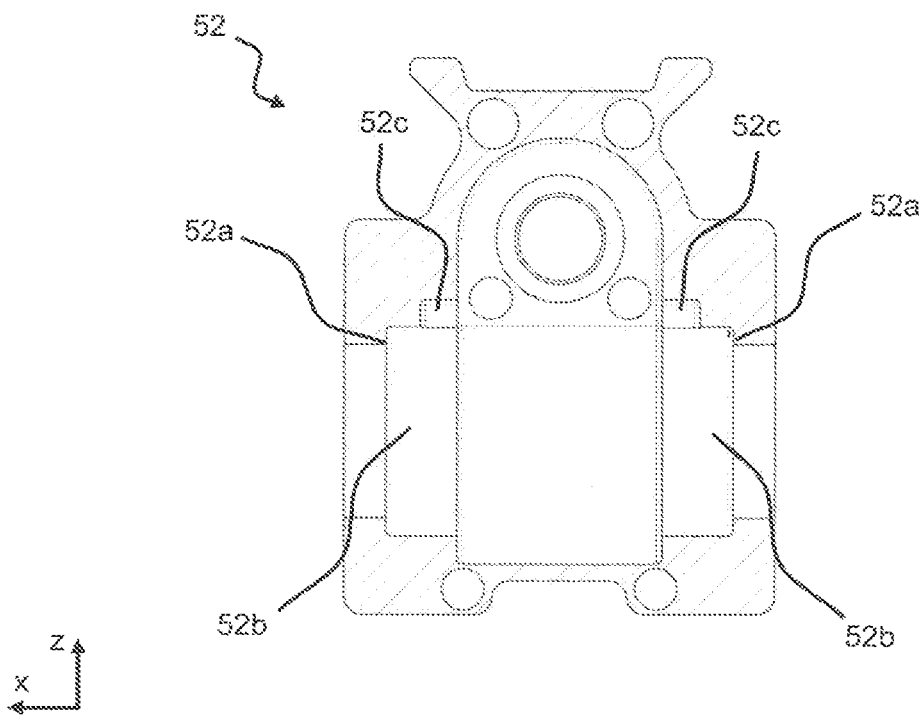
FIG. 5: shows a schematic illustration of a first half of a gear mechanism housing.
Figure 6:
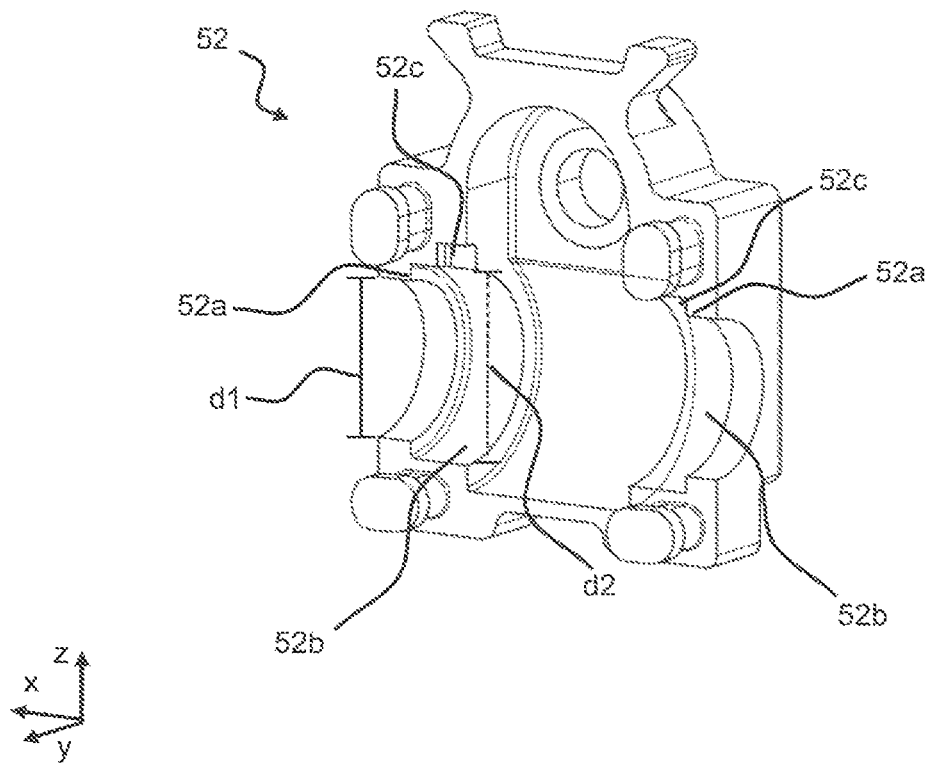
FIG. 6: shows a perspective view of the first half of the gear mechanism housing of FIG. 5, FIG. 7: shows a schematic illustration of the first half of the gear mechanism housing of FIG. 5 with a gear mechanism inserted.
Figure 7:
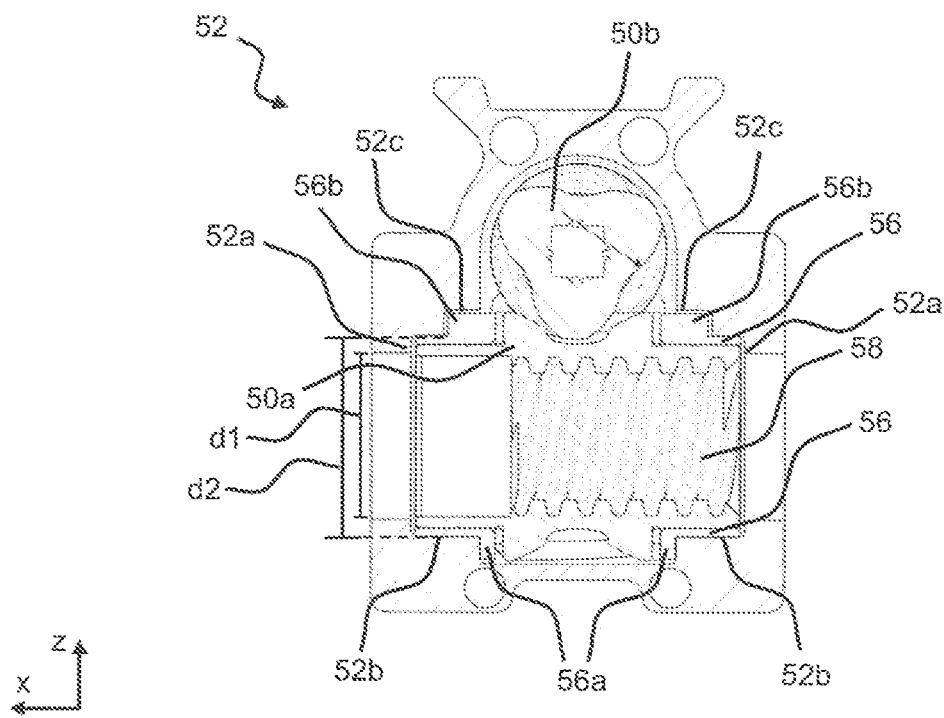
Figure 8:
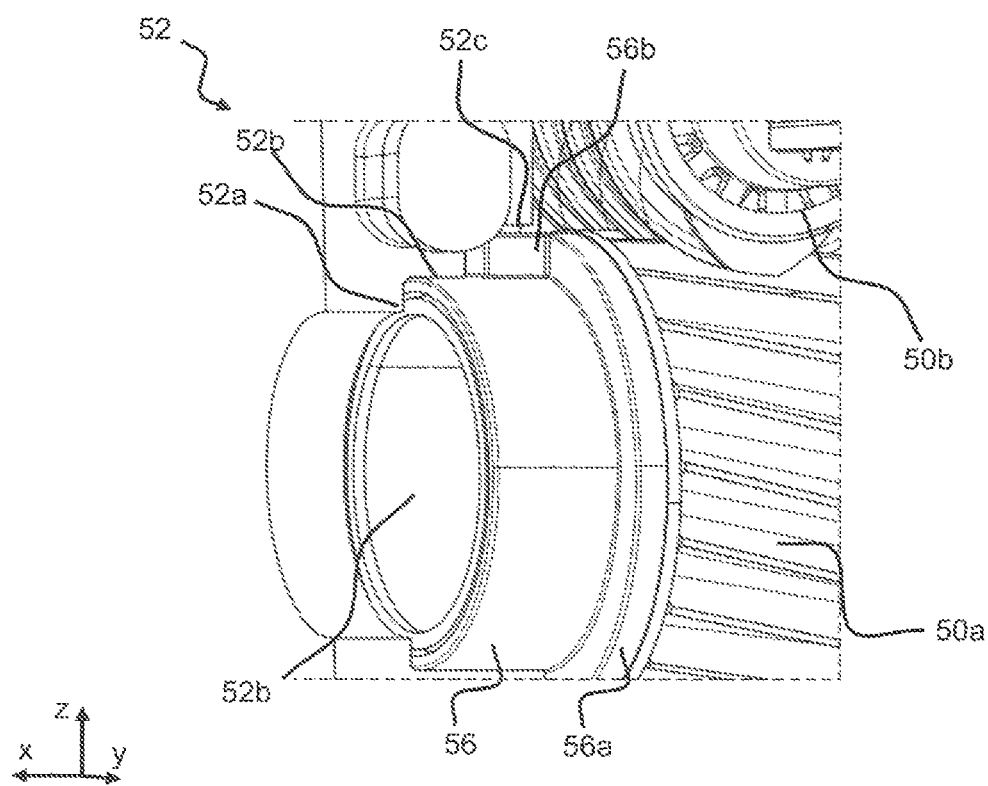
FIG. 8: shows a cut-out of a perspective view of the first half of the gear mechanism housing with the gear mechanism from FIG. 7 inserted.

FIG. 4 shows a cut-out of a longitudinal section through the rail pair in the region of the gear mechanism retention member 54. In order to support the individual gear mechanism elements of the spindle gear 50, there is provided a gear mechanism housing 52 which fills a structural space defined between the gear mechanism retention member 54 and the first rail 12 to the maximum extent with the greatest possible rigidity as a force-carrying housing, that is to say, it is arranged substantially inside the first rail 12. The gear mechanism housing 52 comprises two housing side portions which are in abutment with each other in regions and which are screwed together. The two housing side portions support a drive screw 50b which is arranged transversely relative to the longitudinal direction x of the first rail 12.

The drive screw 50b is operationally connected to a worm gear 50a which is supported in the longitudinal direction x. The worm gear 50a is connected to the spindle 20 in a rotationally secure manner. In this instance, an inner thread portion 58 of the worm gear 50a is screwed in the front end portion 20a of the spindle 20 onto an outer thread of the spindle 20 and fixed by a securing element 34. The securing element 34 is in this instance pressed in the front end portion 20a of the spindle 20 between the spindle 20 and the worm gear 50a.

The front end portion 20a of the spindle 20 is connected to the worm gear 50a in a rotationally secure manner by a press-fitting connection or crimp connection. To this end, between the front end portion 20a which protrudes forward from the worm gear 50a and a portion of the worm gear 50a which is also orientated in a forward direction, one or more securing elements 34 are pressed together by being partially pushed one inside the other. These securing elements 34 are preferably configured in an annular or hollow-cylindrical manner and arranged on the thread-free front end portion 20a of the spindle 20.

The gear mechanism retention member 54, which surrounds the gear mechanism housing 52 and by which the spindle gear 50 is connected to the first rail 12, is configured in a substantially U-shaped manner. The spindle 20 is inserted through two mutually parallel members 54b of the gear mechanism retention member 54. The two opposing members 54b are connected to each other by a web 54a. Each of the members 54b is adjoined by a securing member 54c by which the gear mechanism retention member 54 is fitted to the first rail 12. The securing members 54c are preferably bent over or angled with respect to the respective associated member 54b through approximately 90°, in this instance bent over in a direction directed away from the spindle gear 50.

In the mounted state of the substantially U-shaped gear mechanism retention member 54, the gear mechanism housing 52 is preferably received in the longitudinal direction x between the members 54b. The securing members 54c have threaded holes by which in cooperation with corresponding screws and/or threaded bolts a connection to the first rail 12 is produced.

FIGS. 5 to 8 show portions of the spindle gear 50 with an open gear mechanism housing 52. The spindle gear 50 is surrounded by the gear mechanism housing 52. The gear mechanism housing 52 has in this instance two cylindrical bearing portions 52b for supporting the worm gear 50a which is connected to the spindle 20. The gear mechanism housing 52 has in each case a step 52a which adjoins each of the cylindrical bearing portions 52b, wherein the step 52a is configured to support the worm gear 50a in the event of a crash. In a normal state of use illustrated in FIGS. 7 and 8, the worm gear 50a has a spacing with respect to each of the two steps 52a. In the normal operating state, a gap is provided between the worm gear 50a and the step 52a in this instance. The worm gear 50a can be supported directly on the step 52a in the event of a crash.

A step 52a is arranged in each case at opposing outer sides of the gear mechanism housing 52 in a manner parallel with the spindle axis of the spindle 20. The steps 52a protrude radially inward relative to the cylindrical bearing portion 52b. An inner diameter d1 of the steps 52a is smaller than an inner diameter d2 of the cylindrical bearing portions 52b. The gear mechanism housing 52 has a recess 52c in an upper portion of the cylindrical bearing portion 52b.

The worm gear 50a which is connected to the spindle 20 in a rotationally secure manner is supported by two bearing sleeves 56 in the gear mechanism housing 52. The bearing sleeves 56 has a collar 56a in each case. Each bearing sleeve 56 has a projection 56b which cooperates with the recess 52c of the gear mechanism housing 52. The bearing sleeves 56 are retained in the gear mechanism housing 52 in a manner preventing rotation.

In the event of a crash, in particular a front-end impact or rear-end impact, the first rail 12 and second rail 14 are loaded relative to each other in the longitudinal direction x by crash-related external force influences. A force pulse which is introduced in this instance from the vehicle seat 1 into the first rail 12 must be transmitted to the vehicle via the gear mechanism retention member 54, the spindle gear 50, the spindle 20 and the second rail 14, or vice versa. Such a loading of the longitudinal adjuster 10 can lead to a comparatively very powerful loading of the worm gear 50a in the longitudinal direction x. The radially inwardly protruding steps 52a of the gear mechanism housing 52 provide the worm gear 50a, in an axial direction or in this instance parallel with the longitudinal direction x, with additional support faces, by which the loading of the worm gear 50a in the longitudinal direction x can be better absorbed by the gear mechanism housing 52 and can be directed to the gear mechanism retention member 54.

The features disclosed in the above description, the claims and the drawings may be significant both individually and in combination for the implementation of the invention in their various embodiments to the extent that this is covered by the wording of the independent claims.

LIST OF REFERENCE NUMERALS

1 Vehicle seat
2 Seat portion
4 Backrest
10 Longitudinal adjuster
12 First rail
14 Second rail
16 Inner channel
20 Spindle
20a Front end portion (of the spindle 20)
20b Rear end portion (of the spindle 20)
30 Spindle nut
34 Securing element
40 Rotary bearing
50 Spindle gear
50a Worm gear
50b Drive screw
52 Gear mechanism housing
52a Step
52b Cylindrical bearing portion
52c Recess
54 Gear mechanism retention member
54a Web
54b Member
54c Securing member
56 Bearing sleeve
56a Collar
56b Projection
58 Inner thread portion
60 Motor
70 Motor carrier
d1 Inner diameter
d2 Inner diameter
x Longitudinal direction
y Transverse direction
z Vertical direction

What is claimed is:

1. A longitudinal adjuster for a vehicle seat, comprises:
at least one rail pair which is formed by a first rail and a second rail which can be displaced relative to the first rail in the longitudinal direction, wherein the rails mutually engage around each other with an inner channel being formed,
wherein a spindle nut, which is supported with the second rail, and a spindle, which is operationally connected to the spindle nut, are arranged in the inner channel,
wherein a spindle gear, which is driven by a motor and which cooperates with the spindle, is arranged in an end region of the first rail,
wherein the spindle gear is surrounded by a gear mechanism housing,
wherein the gear mechanism housing has at least one cylindrical bearing portion for supporting a worm gear which is connected to the spindle,
wherein the gear mechanism housing has a step which adjoins the cylindrical bearing portion, wherein the step is configured to support the worm gear in the event of a crash,
wherein an inner diameter of the step is smaller than an inner diameter of the cylindrical bearing portion.

2. The longitudinal adjuster as claimed in claim 1, wherein the worm gear has in a normal state of use a spacing with respect to the step.

3. The longitudinal adjuster as claimed in claim 1, wherein the worm gear can be supported directly on the step in the event of a crash.

4. The longitudinal adjuster as claimed in claim 1, wherein the worm gear can be supported coaxially with respect to a spindle axis of the spindle by the step in the event of a crash.

5. The longitudinal adjuster as claimed in claim 1, wherein the step protrudes radially inward relative to the cylindrical bearing portion.

6. The longitudinal adjuster as claimed in claim 5, wherein the radially inwardly protruding step of the gear mechanism housing in the event of a crash acts as an additional support face for supporting the worm gear in an axial direction on the gear mechanism housing.

7. The longitudinal adjuster as claimed in claim 1, wherein the gear mechanism housing has two steps, and the spindle nut is arranged axially with respect to a spindle axis between the two steps.

8. The longitudinal adjuster as claimed in claim 1, wherein the gear mechanism housing has a recess in the cylindrical bearing portion.

9. The longitudinal adjuster as claimed in claim 1, wherein a worm gear which is connected to the spindle in a rotationally secure manner is supported by two bearing sleeves in the gear mechanism housing.

10. The longitudinal adjuster as claimed in claim 9, wherein each bearing sleeve has a projection which cooperates with a respective recess of the gear mechanism housing.

11. The longitudinal adjuster as claimed in claim 9, wherein the bearing sleeves each have a collar.

12. The longitudinal adjuster as claimed in claim 9, wherein the gear mechanism housing is formed by a plurality of housing portions.

13. The longitudinal adjuster as claimed in claim 1, wherein there is provided a gear mechanism retention member which surrounds the gear mechanism housing and by which the spindle gear is connected to the first rail.

* * * * *